Patented Feb. 1, 1927.

1,615,989

UNITED STATES PATENT OFFICE.

STUART R. MacEWEN, OF TORONTO, ONTARIO, CANADA.

PREPARATION OF SOLUTIONS OF DERIVATIVES OF DIOXYDIAMINOARSENOBENZENE.

No Drawing.    Application filed October 22, 1923.  Serial No. 669,943.

This invention relates to the preparation of solutions of the arsenical drugs commonly known as arsphenamine, neoarsphenamine, sulpharsphenamine and the like, and which are derivatives of dioxydiaminoarsenobenzene, and particularly to solutions of sodium dioxydiaminoarsenobenzene-methanal-sulphoxylate, disodiumdioxydiaminoarsenobenzene and the sulpharsphenamine above referred to and which is described in the Public Health Reports of the United States Government pp. 2783-2798, vol. 37, No. 45. These substances are at present usually sold in powder form and the solutions for injection are made at the time of use, since solutions as now made rapidly become toxic. As solutions must be made with great care, it is desirable that they be made only by thoroughly competent persons, and it is also desirable to save the administrator the time and trouble involved in the making of the solutions. My object therefore is to devise a method of making solutions ready for use which will keep for long periods of time without developing toxicity.

I attain my object by adding to the solution of the drug in water, one or more of the group termed in chemistry sugars and one of the acids of phosphorus or soluble salts thereof.

Experiments so far show that substantially pure dextrose and sodium hypophosphite $NaP(OH)_2$ give very satisfactory results. The amount of both the sugar and sodium hypophosphite may vary considerably. In practice I have found that, assuming a solution containing 5 grammes of sodiumdioxydiaminoarsenobenzene - methanal-sulphoxylate to be required, it may be prepared by dissolving it with 20 grammes of dextrose and ½ gramme of sodium hypophosphite in 100 c. c. of water. I have also used larger proportions of both the sugar and of the hypophosphite. Care must be taken, however, not to use so much sugar that the solution becomes too viscous, or so much of the hypophosphite as to have an irritating effect on the patient. While either the sugar or phosphite alone have a marked effect in preventing the solution becoming toxic by keeping, I find that when used together there is an increased effect several times greater than their individual effects. Other salts which I have found to work more or less satisfactorily are those salts formed by the acids of phosphorus which, like sodium hypophosphite, are adapted to accept oxygen, and particularly salts of the alkali metals, sodium, potassium and sodium-ammonium.

The solution after preparation is put up in sealed ampules for distribution, and will be found to keep satisfactorily for long periods.

In preparing sulph-arsphenamine I have obtained a solution well adapted for subcutaneous injection by using the following proportions: 5 grammes sulph-arsphenamine, ½ gramme hypophosphite, 12 grammes dextrose, 20 c. c. water, 3 c. c. normal caustic soda solution. The alkali is used to overcome the tendency of solutions of sulpharsphenamine to gel, sufficient being used to bring the solution to a condition in which it is only slightly acid, the amount required varying according to the characteristics of the preservative employed.

What I claim is:—

1. A solution of an arsenical therapeutic parasiticide containing as a preservative sugar and an oxidizable salt of a phospho-acid.

2. A solution of an arsenical therapeutic parasiticide containing as a preservative a sugar and a soluble phosphite.

3. A solution of an arsenical thereapeutic parasiticide containing as a preservative a sugar and sodium hypophosphite.

4. A solution of a derivative of dioxydiaminoarsenobenzene containing as a preservative a sugar and an oxidizable salt of a phospho-acid.

5. A solution of a derivative of dioxydiaminoarsenobenzene containing as a preservative a sugar and a soluble phosphite.

6. A solution of a derivative of dioxydiaminoarsenobenzene containing as a preservative a sugar and sodium hypophosphite.

7. A solution of an arsenical thereapeutic parasiticide containing as a preservative a sugar and an oxidizable salt of a phospho-acid and a sufficient quantity of an alkaline reagent to make the solution approximately neutral.

8. A solution of an arsenical therapeutic parasiticide containing as a preservative a sugar and an oxidizable phosphorus salt of an alkaline metal.

9. A stable, non-jellying solution of sulpharsphenamine containing as a preservative sugar, an oxodizable salt of a phosphoacid, and an alkaline re-agent.

Signed at Buffalo, N. Y., this 16th day of October, 1923.

STUART R. MacEWEN.